United States Patent [19]
Allen et al.

[11] Patent Number: 5,240,293
[45] Date of Patent: Aug. 31, 1993

[54] BRITTLE LINED PIPE CONNECTOR

[75] Inventors: William C. Allen, Pasadena; Stephen D. Pye, Los Angeles; Gerald M. Hamblin, St. Helena; Jose M. Perez, Calexico; William E. Amend, Yorba Linda, all of Calif.; John D. Bush, Jakarta, Indonesia; David Holligan, Santa Rosa; Delbert E. Pyle, Pine Grove, both of Calif.

[73] Assignee: Union Oil Company of California, Los Angeles, Calif.

[21] Appl. No.: 753,612

[22] Filed: Aug. 30, 1991

Related U.S. Application Data

[62] Division of Ser. No. 427,758, Oct. 26, 1989, Pat. No. 5,069,485.

[51] Int. Cl.$^5$ .................. F16L 57/00; F16L 58/14
[52] U.S. Cl. .................................. 285/55; 285/288; 285/910; 285/355
[58] Field of Search ............ 285/55, 288, 291, 910, 285/919, 355; 277/11, 188 R, 188 A

[56] References Cited

U.S. PATENT DOCUMENTS

| | | | |
|---|---|---|---|
| 590,811 | 4/1897 | Storrow | 285/55 |
| 2,040,766 | 5/1936 | Chappell | 285/55 |
| 2,233,734 | 3/1941 | Ely et al. | 285/55 |
| 2,340,537 | 1/1944 | Keener | 285/55 |
| 2,790,661 | 4/1957 | Tamminga | 285/334.3 |
| 3,172,934 | 3/1965 | Krieg | 285/55 |
| 3,189,371 | 6/1965 | Swan | 285/55 |
| 3,199,879 | 8/1965 | Fleming | 285/55 |
| 3,276,792 | 10/1966 | Dunton | 285/55 |
| 3,427,050 | 2/1969 | Krieg | 285/55 |
| 3,472,533 | 10/1969 | Turner | 285/55 |

(List continued on next page.)

FOREIGN PATENT DOCUMENTS

| | | | |
|---|---|---|---|
| 544155 | 9/1959 | Belgium | 285/55 |
| 726589 | 1/1966 | Canada | 285/55 |
| 904975 | 9/1962 | United Kingdom | 285/55 |

OTHER PUBLICATIONS

"TFP & TFT Metal Lined Pipe and Tubing", Kawasaki Heavy Industries, 1983.
API Recommended Practice 10E (RP10E), Second Ed. Jul. 1, 1987, "Recommended Practice for Application of Cement Lining to Steel Tubular Goods, Handling, Installation and Joining", American Petroleum.
AWWA C205-85, Edition Approved Jun. 23, 1985, "AWWA Standard for Cement-Mortar Protective Lining and Coating for Steel Water Pipe—4 in. and larger—Shop Applied" American Waterworks Association.

(List continued on next page.)

Primary Examiner—Eric K. Nicholson
Attorney, Agent, or Firm—Gregory F. Wirzbicki; William O. Jacobson

[57] ABSTRACT

One or more rigid sealing segments are attached to pipe end sections and the assembly lined to form a fluid-resistant joint. A segment surface forms the primary sealing interface of lined pipe sections without the need for a conventional removable liner edge seal. The lining process and configuration sealably bonds the liner to the fluid-resistant sealing segment and to the non-fluid-resistant pipe. The manner of bonding both avoids (or limits) liner stress and covers the non-fluid-resistant material of the pipe. In an alternative embodiment, the sealing segments are engaged at mating threaded surfaces, the mated threads providing a single primary sealing and engagement interface. Redundant liner end sealing may also be accomplished by a sandwiched deformable material if added reliability of sealing harsh fluids is desired. In another embodiment, portions of the rigid sealing segments are slidably mounted relative to each other and the primary seal interface is temperature actuated.

14 Claims, 4 Drawing Sheets

U.S. PATENT DOCUMENTS

| | | | |
|---|---|---|---|
| 3,596,931 | 2/1969 | Mishler | 285/55 |
| 3,805,872 | 7/1959 | Routh | 285/55 |
| 4,026,583 | 5/1977 | Gottlieb | 285/55 |
| 4,219,078 | 8/1980 | Lee | 285/115 |
| 4,269,437 | 5/1981 | Shaw et al. | 285/55 |
| 4,313,625 | 2/1982 | West | 285/55 |
| 4,366,971 | 1/1983 | Lula | 138/109 |
| 4,400,019 | 8/1983 | Fruck | 285/55 |
| 4,507,842 | 4/1985 | Werner | 277/11 |
| 4,509,776 | 4/1985 | Yoshida et al. | 285/55 |
| 4,537,424 | 8/1985 | Press et al. | 285/55 |
| 4,556,240 | 12/1985 | Yoshida | 285/189 |
| 4,691,740 | 9/1987 | Svetlik et al. | 138/109 |
| 4,883,292 | 11/1989 | Kuroki | 285/286 |
| 5,028,081 | 7/1991 | Fournier | 285/334.4 |

OTHER PUBLICATIONS

"Design and Fabrication of Polymer Concrete-Lined Pipe for Testing Geothermal Energy Processes", Final Report, Dec. 1981, by Polymer Concrete Research, Inc., Albert O. Keading.

"Perma Couple Pipeline Couplings", Flexweight Corporation.

BRITTLE LINED PIPE CONNECTOR

This application is a division of application Ser. No. 7/427,758, filed Oct. 26, 1989, now U.S. Pat. No. 5,069,485.

FIELD OF THE INVENTION

This invention relates to piping having a brittle liner and containing harsh fluids. More specifically, the invention is concerned with lined piping connectors which prevent exposure of non-fluid resistant piping to the harsh fluids at the connector joints.

BACKGROUND OF THE INVENTION

Many piping system applications in chemical and natural resource recovery industries involve the handling of corrosive, erosive, scaling or otherwise hard-to-handle fluids. One economic approach to handling these difficult fluids is to cover or line the interior of low cost, non-fluid-resistant pipe with a fluid-resistant liner. The pipe material, such as low carbon steel, provides low cost structural support for the costlier and/or structurally inadequate liner. Although some thin liners or coatings can be sprayed on, more severe applications (e.g., erosive slurries) or other factors may require thicker liners. One type of thicker, fluid resistant liners is composed of a low tensile strength or brittle material, such as cement.

These brittle lining materials must be able to structurally withstand the severe applications at the piping joints. The severe applications tend to chip, spall, crack, pit, and delaminate the lining at these critical points. These structural problems become especially troublesome at brittle liner edges in certain types of joints. For example, removable joints may need to be periodically opened for inspection, cleaning, or testing. Opening and resealing adds further structural demands on the brittle liner edges at these critical areas.

The primary objectives of a removable lined pipe joint are to: 1) allow assembly of lined pipe sections; 2) seal the assembled pipe sections; 3) prevent exposure of non-fluid-resistant piping material to a variety of harsh flowing materials; 4) structurally withstand a variety of operating environments; and 5) allow joint disassembly and reassembly. The lined pipe connector apparatus at these joints should also be rugged in construction, easy to maintain, safe, reliable, and low in cost.

Current lined pipe joints may perform some of these objectives well, but other objectives may be accomplished poorly or not at all. Connectors having engaged or sizably loaded liner seals satisfy these objectives for piping lined with metal or elastomeric materials, but are not practical for fragile or brittle liners. Engaged (e.g., threaded) loads and liner end surface preparations (e.g., machining to obtain a smooth sealing surface finish) can impose high stresses on the brittle liner edges, resulting in damage to the brittle liner and failure at the piping joint.

In addition to a piping seal (e.g., pipe threads), conventional brittle lined pipe connectors add a separate easily deformable (soft) material at the interfacing edges of the *liner*. The soft liner seal requires less load on the liner to prevent exposure of the non-resistant pipe at the joint to the harsh fluid. The added liner seal must also be a primary seal, since soft liner seal failure exposes the non-fluid-resistant pipe material to the harsh fluids, causing long term piping failure even if the piping seal is not leaking.

One type of liner edge seal places a putty-like (i.e., plastic flowing or semi-fluid) material at the liner edges. The putty-like material is generally initially unsupported. The edge seal material may harden, such as a cement slurry. However, the use of the putty-like material, especially a hardenable slurry, limits or precludes disassembly capability.

Using the putty-like seal may also require internal access *after* assembly. Access may be required for patching, removal of extruded putty-like material, or inspection. Although the plastically flowing material limits stress on a brittle liner (i.e., only a small liner seal load is needed to plastically flow the putty-like material), the unsupported putty may not reliably seal the liner edges or be able to withstand severe applications, such as handling an erosive fluid.

Another type of sealed edge liner joint uses a soft elastomeric material at the joint lining interface for the liner end seal. A groove or retaining surface may be added to the lining material to provide support for this type of deformable seal, in contrast to a putty-like material which would not be retained by a groove. In addition to anchoring the elastomeric material, the groove can provide space for seal distortion under load.

However, liner end sealing surfaces may be rough, shrink or otherwise be out of position to be sealed by the elastomeric element. The grooves and elastic deformation may also apply excessive seal loads to a brittle liner. A brittle liner may also require special sealing surface preparation to effect a seal within the tolerances and limited seal load capability of a fragile liner material.

Both of the conventional brittle liner edge seal methods require an added primary sealing component. The sealing component is either an unsupported, plastically flowing material or an elastic material at the liner edges. Both require added cost and may adversely affect reliability and safety.

None of the current or alternative approaches known to the inventors eliminates the problem of brittle liner edge sealing without risking liner damage (from excessive seal loads) or loss (with a plastic flowing material) of the seal. Even if in place and undamaged, the reliability of these lined joints appears to be limited.

SUMMARY OF THE INVENTION

At least one rigid sealing ring is bonded to an end of a non-fluid-resistant pipe *and* a brittle liner in a manner which covers the non-resistant material of the pipe at a joint. The fluid resistant sealing rings avoid (or limit) liner edge sealing stresses *and* provide a single primary pipe sealing surface. The joint end surfaces can also be filled or redundantly sealed by a deformable material if added sealing reliability is desired. Alternative embodiments can also combine the engaging and primary sealing functions at a single mated threaded joint or provide redundant engagement, if desired. The connector achieves a dependable, low cost joint assembly capable of withstanding harsh fluid and operating applications. The invention avoids separate pipe and liner end seals which may apply unacceptable stresses on the brittle liner.

BRIEF DESCRIPTION OF THE DRAWINGS

In these Figures, it is to be understood that like reference numerals refer to like elements or features.

DESCRIPTION OF THE PREFERRED EMBODIMENT

Figure 1:
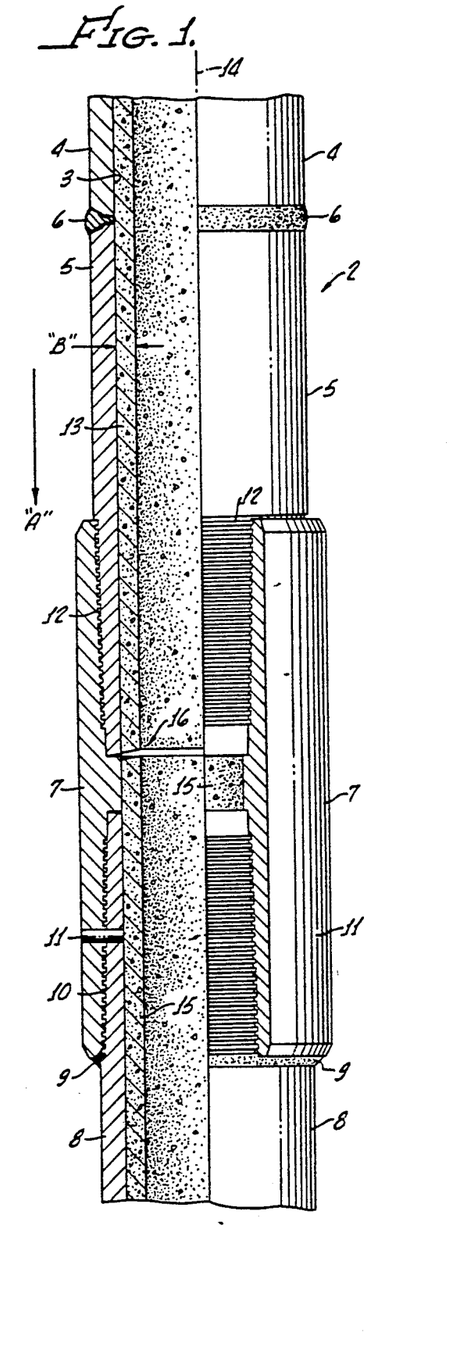
FIG. 1 shows a cross sectional side view of a lined pipe joint having a rigid alloyed connector apparatus without a deformable liner seal.

FIG. 1 shows a cross sectional and cut away view of the preferred embodiment of a lined pipe connector apparatus 2. The interior surface 3 of a first low carbon steel pipe section or pin 4 forms an interior passageway having an axis 14. The first pipe or duct section 4 is welded at one end to a first high alloy, rigid sealing segment 5 at a butt weldment 6. Alternatives to welding attachment include mating threads, adhesive, bolting, or pinned connections.

A rigid second sealing segment, such as the second ring-like high alloy pipe end or box 7 shown, is attached to a second pipe section 8 by a lap weldment 9, and/or engaged threads 10 (male threads on second pipe section 8 engaging the female threads on second sealing segment 7), and/or pins 11. The segments hold the pipe sections together (form a joint) and seal at engaged threads 12 (female threads on second sealing segment 7 engaging the male threads on the first sealing segment 5).

The cylindrical pipe sections 4 & 8 are composed of structural materials, such as conventional carbon steels. These structural materials are not resistant to corrosive or other attack by many hard-to-handle fluids which could otherwise be contained within the pipe sections. However, the pipe end sealing segments 5 & 7 are composed of structural materials resistant to these harsh fluids (such as high alloy steels). The carbon steel pipe or duct sections are protected from harsh fluid contact by the sealing segments and one or more brittle liners.

A first brittle liner 13 is bonded or sealably attached to both the first pipe section 4 at the interior surface and the first sealing segment 5. The first sealing segment 5 to first liner 13 bonding serves to attach and seal (or limit exposure of) the low carbon steel pipe section 4 to the fluid flowing within the void or passageway of the first cylindrical liner 13. The fluid is exposed to the liner-segment bond at a gap 16 near the end surfaces of the first liner 13. The first liner 13 may be directly bonded to the carbon steel pipe and high alloy steel sealing segment by the cementitious properties of the liner, or another sealable attachment means, such as adhesive, or other coupling system may be used.

A second brittle liner 15 is attached to both the second pipe section 8 and the second sealing segment 7. The second sealing segment 7 bonding again forms a fluid seal between the second liner 15 and the second sealing segment 7 at gap 16.

The liner gap 16 between the edges of first liner 13 and second liner 15 is open (i.e., no deformable gasket is needed to seal the liner edges in order to protect the pipe material). An alternative embodiment may fill the space with a non-sealing gap filler such as a putty-like material. The liner gap 16 opposing surfaces can be generally planar and perpendicular to the centerline 14, or (as shown) form a truncated conically shaped cavity from the inside diameter of the liner 15 to lower (direction "A") inside diameter of the second sealing segment 7. If a fluid gap filler is used, the cone shaped gap 16 forms a ring-like cavity to retain the fluid when direction "A" is pointed down.

The brittle liners 13 & 15 are typically composed of an inert cementitious material, such as portland cement or concrete. These brittle liner materials are resistant to many harsh fluids, but can be difficult to seal with a deformable seal. Concrete surfaces may be porous or rough, besides being brittle (e.g., subject to cracking), making sealing difficult unless bonded (as shown) to the adjoining element. The radial thickness "B" of the liner is at least 0.32 cm (⅛ inch) in this embodiment as per American Petroleum Institute "Recommended Practice for Application of Cement Lining to Steel tubular Good, Handling, Installation and Joining." However, thickness "B" is a function of pipe size, liner materials, fluid resistance and other factors and other thicknesses may be appropriate in other embodiments and applications.

The lack of a deformable primary seal at the liner edges in the present invention avoids (in this embodiment) or limits (in other embodiments) sealing loads on the brittle or fragile liner. The primary sealing (at the threaded joint 12) is accomplished at easy-to-machine pipe threaded surfaces and/or at metal-to-metal interface surfaces as found on premium connectors and sealing segments. The high alloy sealing segment withstands the sealing and joint stress, as well as being fluid resistant. Primary engaging and sealing surfaces can also be structured so as to enhance attachment or bonding and to provide a more tortuous pathway for encroaching fluids.

"Fluid-resistant" material is defined, for the purposes of this invention, as material able to withstand the corrosive, erosive or other deleterious effects of the flowing fluids within the pipe sections. Without the sealing rings, harsh fluids would attack the structural non-fluid-resistant material of the piping and pipe interfaces, unless the liner edges were joined or sealed as in conventional brittle lined connectors.

Figure 2:
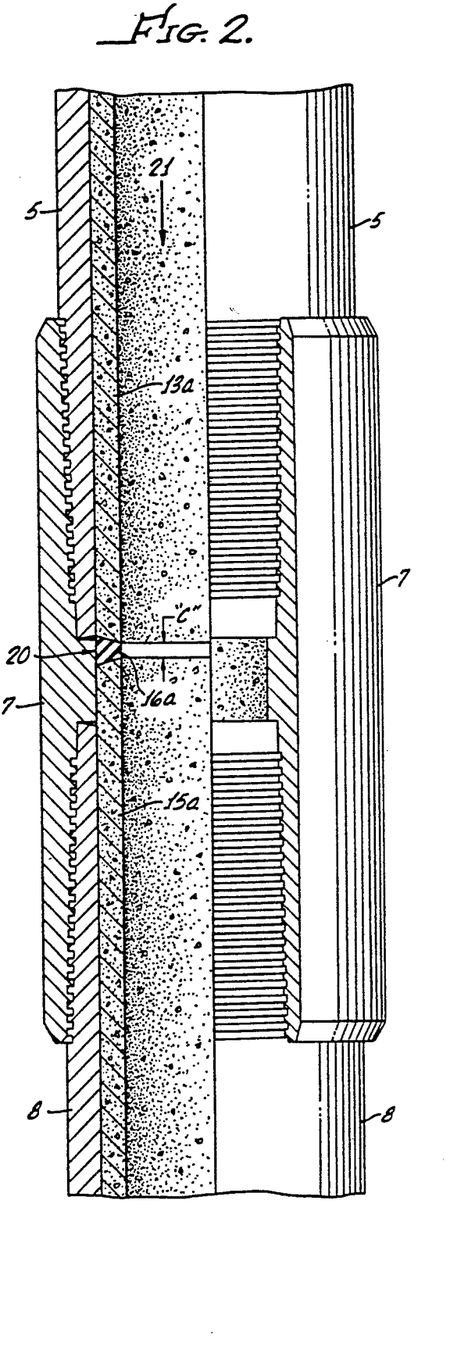
FIG. 2 shows a cross sectional view of a portion of an alternative connector apparatus which also includes a redundant deformable liner seal.

FIG. 2 shows a cross sectional view of a portion of an alternative embodiment connector apparatus having a redundant or secondary seal. The first seal segment 5 is again threadably attached to the second seal segment 7 to form the primary seal at the engaged threads. An alternative first liner 13a and an alternative second liner 15a form a first alternative gap or cavity 16a. The first alternative gap 16a is filled with a sealing element, such as O-ring or ring gasket 20 to form a secondary seal at the interfacing surfaces of the liners. An alternative embodiment would allow the seal segments to be composed of non-fluid-resistant materials, requiring the gasket 20 to form the primary seal. The gasket 20 need only be a putty-like gap filler if a high reliability secondary or primary seal is not required. The putty-like material extrudes into the contained fluid passageway 21 when the cavity 16a is compressed, e.g., by incremental torquing of sealing segments 5 & 7.

The gasket 20 may also be composed of a soft elastic or reinforced plastic material. The sealing loads developed by the squeezed elastic material are limited by the distance "C" over which compression of gasket 20 may occur before the first alternative liner 13a is contacted by the second alternative liner 15a. The ring-like shape and angled surfaces of the alternative gap 16a also tends to retain and seal the gasket 20 against the interfacing liner and segment surfaces. Reliable retention and sealing are expected to be effective where the dimensional tolerance of "C" is large, even if liner end surfaces are misaligned or partially unbonded from the segments.

Figure 3:
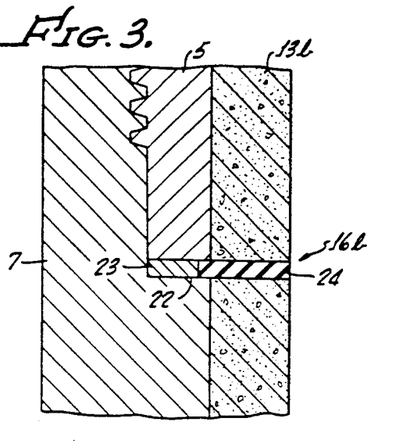
FIG. 3 shows a cross sectional view of an interface portion of another connector apparatus having a composite liner seal for sealing redundancy.

FIG. 3 shows a cross sectional view of an interface portion of another alternative embodiment connector apparatus. The interfacing portions of a first high alloy or fluid-resistant sealing segment 5 is threadably attached to the second fluid resistant segment 7 similar to that shown in FIG. 1. However, the sealing segments are not fully abutting near the segment interface (as shown in FIGS. 1 & 2), but segments leave an extended gap 16b between alternative liners 13b & 15b and portions of the segments 5 & 7. The extended gap 16b is filled with a composite gasket 22. The composite gasket 22 forms a redundant seal in this embodiment (high alloy segments), but in alternative embodiments (carbon steel segments) the gasket can form a primary seal. The composite gasket 22 is composed of a metallic portion 23 and an elastomeric portion 24. The elastomeric portion 24 is placed between the end surfaces of the liner sections. The metallic portion 23 is placed between the fluid resistant segments. The metallic portion 23 not only seals but limits liner compressive loads resulting from joining or make up of the joint.

Figure 4:
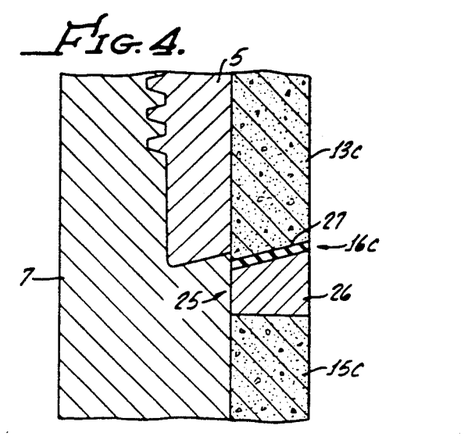
FIG. 4 shows a cross sectional view of an interface portion of another embodiment similar to that shown in FIG. 3.

FIG. 4 shows a cross sectional view of an interface portion of another alternative embodiment connector apparatus having a composite redundant (or in an alternative embodiment, primary) seal. The interfacing portions of first high alloy or fluid-resistant sealing segment 5 is threadably attached to the second fluid-resistant sealing segment 7 similar to that shown in FIG. 1. Another alternative first liner 13c and another alternative second liner 15c leave another alternative gap 16c which does not extend between the seal segments. The alternative gap 16c is filled with a second composite gasket 25. The second composite gasket 25 is a laminated ring construction of a second alloyed metallic portion 26 and a second elastomeric or plastic portion 27. The metallic ring 26 and laminated construction provides a ring-like anchor for the elastomeric material portion 27. The angled or beveled end surface of the first alternative liner 13c also tends to prevent liner unbonding. A still further modification can replace the material of the elastomeric portion 27 with a putty like material to effect the secondary sealing at the mating liner interface surfaces.

Figure 5:
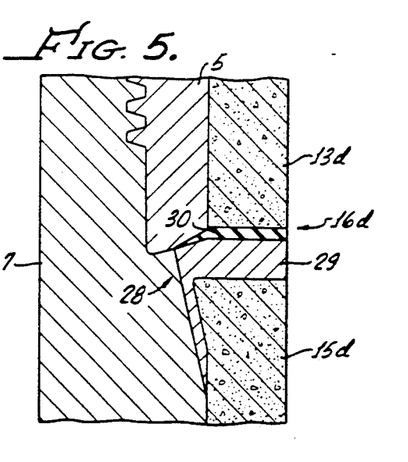
FIG. 5 shows a cross sectional view of an interface portion of another alternative embodiment connector apparatus with a composite seal having a landing surface.

FIGS. 5 shows a cross sectional view of an interface portion of another alternative embodiment connector apparatus similar to FIG. 3, but having a segment-to-segment landing or abutting surface. An interfacing portion of the first fluid-resistant sealing segment 5 is threadably attached to the second fluid resistant sealing segment 7, again similar to that shown in FIG. 1. Another first liner section 13d and another alternative second liner 15d leave another alternative gap 16d when the segments are abutably joined. The alternative gap 16d is filled with another composite gasket 28 to form a secondary seal in this embodiment or, if the segments are composed of non-fluid-resistant materials, a primary seal in another embodiment. The alternative composite gasket 28 is a laminated construction composed of a fluid-resistant, alternative metallic portion 29 and an alternative, fluid resistant elastomeric portion 30. The alternative metallic ring 29 provides an anchor for the alternative elastomeric material portion 30. The alternative metallic ring 29 has also been radially extended (when compared with FIG. 4). The shape of the extended portion of the metallic ring 29 is to handle liners having lateral (along axis 14 as shown in FIG. 1) shrinkage which exceeds radial shrinkage. If the liner shrinks or pulls back laterally (leaving a gap at the inside diameter interface of the metallic ring 29 and liner 15d), the liner will tend to remain in contact with the alloy metallic ring 29 along its outside surface near the one, maintaining sealing integrity. The extended ring 29 portion also accomplishes a metal-to-metal, fluid resistant primary seal and further limits compressive loads transmitted to the liners.

Figure 6:
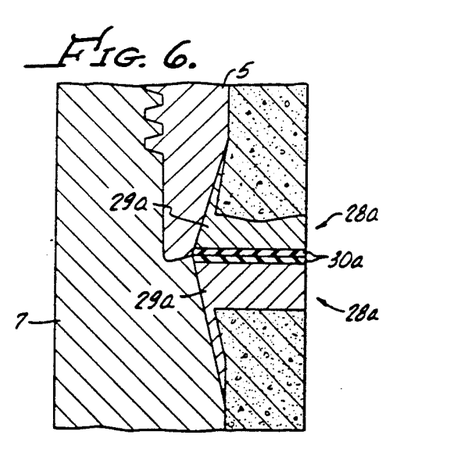
FIG. 6 shows a cross sectional view of an alternative embodiment similar to that shown in FIG. 5.

A related alternative embodiment pair similar to FIG. 5 is shown in FIG. 6. Another alternative composite gasket 28a is provided and attached to both of the interfacing surfaces of the liners and segments 5 & 7. The alternative high alloy metallic ring portions 29a provide smooth and fluid resistant surfaces where a deformable sealing material 30a can be placed to form a redundant seal.

FIG. 6 also provides a beveled end interface attachment surface between the first (shown uppermost) liner portion and one of the metallic ring portions 29a. Radial shrinkage or expansion of the liner would still tend to seal the mating ring portion 29a against one of the beveled end surfaces of the liner, even if lateral shrinkage occurred. This embodiment also handles liner shrinkage, as previously shown and discussed (related to FIG. 5). This shape tends to distribute and focus sealing stress towards the center point of the liner, away from the critical edges.

Figure 7:
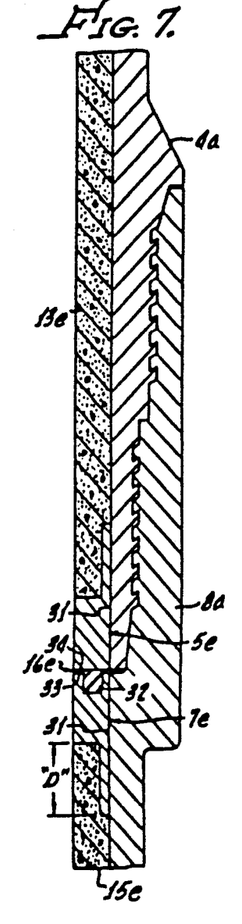
FIG. 7 shows a cross sectional view of an alternative embodiment of a connector apparatus which primarily seals near the liner interface but limits liner seal loads.

FIG. 7 shows a cross sectional view of still another alternative embodiment where conventional structural piping connectors retain the joint attaching functions while the high alloy segmented rings function only as a primary seal. The alternative low carbon steel pipe sections (including threaded ends) 4a and 8a are threadably engaged to each other at the radially enlarged end. The alternative high alloy (sealing only) segments 5e and 7e are bonded or otherwise sealably attached to the alternative liners (13e and 15e) and pipe sections at pipe-to-segment interfaces 31. The pipe-to-segment bonding can be by threads, pins, adhesives, welding, interference or shrink fit. This arrangement provides a limited freedom to move in response to stress while maintaining a reliable seal.

The alternative second sealing segment 7e includes a groove or cavity 32. Another sealing element, such as an elastomeric or plastic reinforced gasket or O-ring 33 is contained by the groove 32 and the interfacing surface 34 of the alternative first sealing segment 5e. The groove 32 and interfacing surface 34 are shaped and dimensioned to seal and contain the conducted harsh fluid within the passageway (shown to the left of liners 13e and 15e). This primary seal prevents the fluid from passing the seal ring 33 and coming into contact with the non-fluid-resistant pipe sections 4a and 8a. The alternative gap 16e is shaped and dimensioned to limit abutting contact between the sealing segments 5e and 7e when the pipe sections 4a and 8a are fully engaged (i.e., bottomed). The attachment of the segments to the pipe sections 4a and 8a distributes the limited seal load to the structural material of the pipe, rather than the brittle liners 13e and 15e in the case of a fixed end ring assembly.

When compared to the threadably engaged sealing segments shown in FIG. 1, the alternative ring-like sealing segments of FIG. 7 are still attached to the pipe, are still also attached to the liner, and are still the primary joint seal location. The result is still a bonded segment attachment which covers the pipe sections (and pipe to sealing segment joint) from fluid exposure. In contrast to the embodiment shown in FIG. 1, the alternative ring-like segments of FIG. 7 are not engaged (i.e., are not a pin and box assembly) and the primary seal also serves as a liner gap filler. The laterally extended alternative pipe-to-segment bonding surface length "D" (measured from one end on the inside diameter to an end bonded to the pipe) provides several advantages. It provides a longer tortuous path in the event of leakage at the liner-to-segment bonded surfaces, allows a frictional fit or other low stress bonding means to the pipe, and affords a greater sealing load transfer to the pipe capability. The total segment length (from gap 16e to the end bonded to the pipe) is approximately 2.5 cm (1 inch) for one size of the embodiment shown, but will typically range from 0.6 to 5 cm (¼ to 2 inches) or for other pipe diameter sizes.

Figure 8:
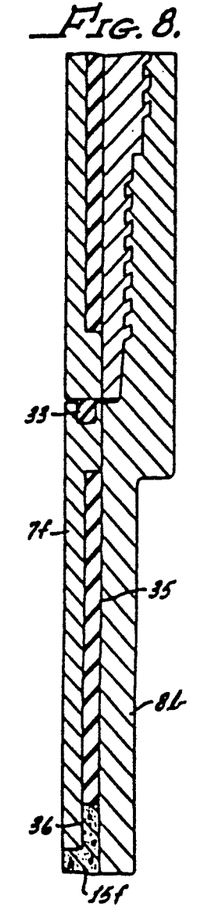
FIG. 8 shows a cross sectional view of an alternative connector apparatus having a primary and redundant seal near the liner interface, similar to that shown in FIG. 7.

FIG. 8 shows an alternative sealing connector apparatus similar to the seal-only connector apparatus shown in FIG. 7. An alternative second sealing segment 7f is attached to a second pipe section 8b. The alternative second sealing segment 7f is again composed of a fluid-resistant material, such as high alloy steel, while the second pipe section 8b is composed of a structural material such as carbon steel. The total length or lateral extension of the alternative second sealing segment 7f is now measured on the inside diameter of the sealing segment. This added cylindrical length tends to seal the sealing segment to liner materials having significant radial shrinkage or, as shown, allows placement of an alternative secondary sealing gasket 35.

In addition to an elastomeric or plastic seal ring 33 at the segment interfaces as the primary seal, an alternative secondary sealing gasket 35 is placed at the liner-to-pipe and -segment interfaces. The sealing gasket 35 fills a recess at the sealing segment to liner interface and the sealing gasket 35 may be composed of a plastic material, such as Teflon, or elastomeric material. The sealing gasket 35 is shaped as a relatively open cylindrical ring and serves to further seal the pipe from exposure to the harsh, but contained fluid. This further sealing is redundant if the alternative liner 15f is sealed to the alternative sealing segment at the liner-segment interface 36.

Figure 9:
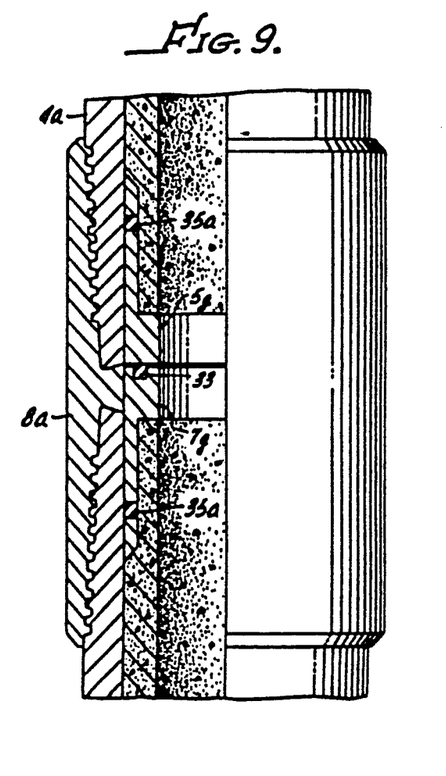
FIG. 9 shows a cross sectional view of an alternative connector apparatus similar to that shown in FIG. 8.

FIG. 9 shows an alternative sealing connector apparatus similar to the laterally extended apparatus shown in FIG. 7, but having an alternative secondary plastic or elastomeric seal 35a. An alternative mating pair of sealing segments 5g and 7g are similarly sealed by an seal ring 33 at the segment interface surfaces. The pair of alternative deformable gaskets 35a provides an alternative redundant or secondary seal at the segment-to-liner and segment-to- pipe interfaces. The non-fluid-resistant alternative piping sections 4a and 8a are again engaged to place the sealing surfaces in a mating position when the sections are joined.

Figure 10:
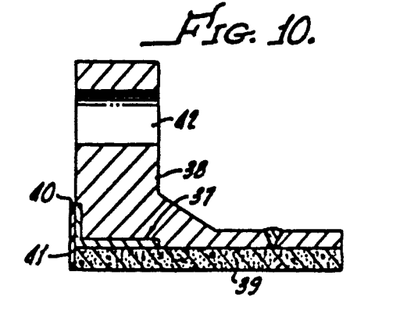
FIGS. 10 shows a cross sectional view of a flange seal ring embodiment of a connector apparatus.
Figure 11:
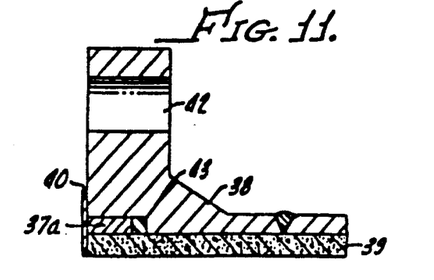
FIG. 11 shows a cross sectional view of an alternative flange seal ring.

FIGS. 10 and 11 show alternative embodiments of the connector apparatus for application to a flanged joint. One alternative shown in FIG. 10 has a flange sealing segment 37 attached to a carbon steel flange 38. The rigid flange sealing segment 37 is composed of a fluid resistant material, such as a high alloy steel, and is covered by a flange liner 39. The flange liner 39 is again composed of a brittle material, such as cement, and is attached to the inside passageway of flange 38. The flange liner 39 is also attached to the flange sealing segment 37 to cover and isolate the carbon steel flange 38 and the attached pipe from the harsh fluid. The flange 38 has been modified (machined) to provide a recess for the placement and attachment of the flange sealing segment 37. The machined surfaces are treated and finished as required for bonding and the assembly lined. A deformable flange gasket 40 abuts the face seal portion 41 of the flange gasket 40 to an adjoining flange (not shown for clarity), forming a sealed interface. The adjoining flange is attached by means of bolts (not shown for clarity) placed in one or more bolt holes 42. Alternative embodiments may replace the bolts and bolt holes 42 with other joining or engaging means.

The elastomeric flange gasket 40 laterally extends to increase liner-to-segment area, and also extends radially inwardly to (redundantly) seal the liner edges, but alternatively may only extend to the segment-to-liner interface. The gasket-to-segment interfaces are the primary sealing surfaces. The shape and dimension of the flange gasket 40, rigid sealing segment 37, end surface of the flange liner 39, and the elastomeric material of the flange gasket 40 can limit or avoid sealing loads on the brittle flange liner 39. The flange gasket 40 can also be of composite construction, similar to the composite gasket 22 shown in FIG. 3 to further limit seal loads in an alternative embodiment.

Another alternative flanged connector embodiment is shown in FIG. 11 and is similar to the flanged embodiment shown in FIG. 10. The flange liner 39 again covers an alternative flange sealing segment 37a which is attached to the flange liner 39 and flange 38, typically by the cementing properties of the liner itself (i.e., the cement liner is applied as a slurry to the pipe and sealing segment, bonding to both). A sealing gasket or element 43 is provided to further assure that the fluid within the passageway does not contact the carbon steel flange 38 even if the flange liner 39 to segment 37a bonding fails to seal. The flange sealing gasket 43 is contained so that a plastically flowing material, such as Teflon, redundantly seals one of the fluid leakage paths to the carbon steel flange 38. The flange gasket 40 again forms the primary seal at the flange faces.

Figure 12:
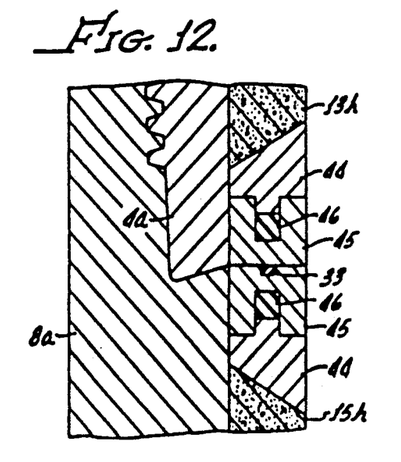
FIG. 12 shows a cross sectional view of a temperature actuated embodiment of the connector apparatus similar to that shown in FIG. 7.

FIG. 12 shows a cross sectional view of a floating portion or temperature actuated embodiment of the connector apparatus. The interior surface of the cylindrical liner and sealing segments again form a fluid conducting passageway 21.

A first pair of sealing segment portions 44 are bonded *only* to the first and second alternative liner sections 13h and 15h. A second pair of sealing segment portions 45 are attached *only* to the pipe section ends 4a and 8a. Although the sealing segment (or portions thereof) is bonded to both the liner and pipe section ends, the first sealing segment portions 44 are only bonded to the liner sections and are free to move relative to pipe section ends. The slidably attached or floating first seal segment portions 44 can move laterally (parallel to direction "A" in FIG. 1) in response to liner stress, shrinkage or other factors.

A fluid-like material 46 which expands upon heating (i.e., a significant temperature coefficient of expansion), such as Teflon at geothermal temperatures, is placed in the piston-like cavity formed between the first and second segment portions. Upon heating from flowing geothermal fluids in the fluid conducting passageway 21, the fluid-like material 46 expands to seal the interfacing surfaces of the segment portions, maintain a load on the liner. The sealing ring 33 completes the fluid containment to accomplish hermetic sealing of the fluid in the joint.

The oblique angle of the interface attachment between the liners (13h and 15h) and the first sealing segment portion 44 tends to generate a sealing force on the liner which also forces the liner against the pipe ends. This interface may have alternate oblique angles to obtain a different fraction of lateral and radial loads on the liner.

The non-attached interface surfaces between the alternative first sealing segment portion 44 and the alternative pipe ends 4a and 8a may be spaced apart or in sliding contact, as shown. The interface surfaces of the second sealing segment portion 45 and pipe ends are bonded. An alternate embodiment would provide a single first and second sealing segment portion (44 & 45) attached to one pipe end 4a abutting or otherwise sealing against the mating liner or other alternative pipe end 8a surface.

Figure 13:
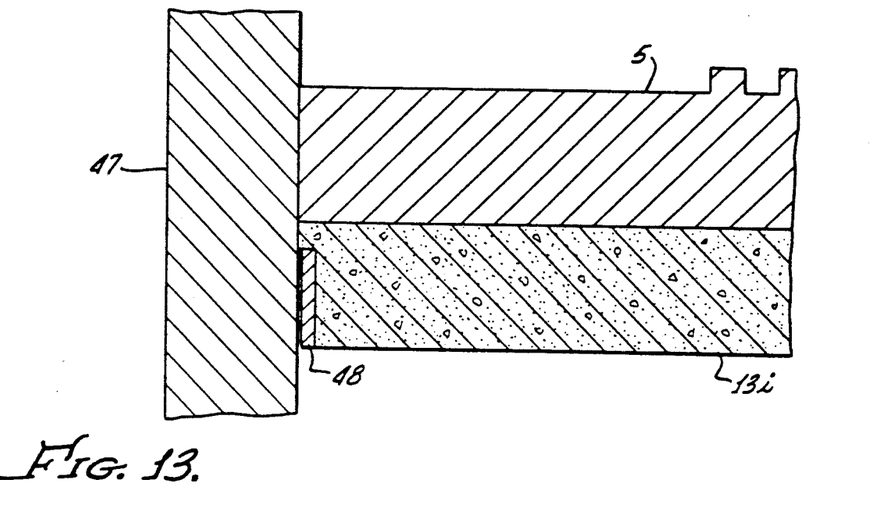
FIG. 13 shows a cross sectional view of a liner end surface insert embodiment during liner casting.

FIG. 13 shows a cross sectional view of a liner end surface insert embodiment during liner casting. Casting end ring or plate 47 provides a barrier to the flow of cement slurry which forms an alternative liner 13i after it hardens. As the slurry hardens, it bonds to the high alloy segment 5 and the attached carbon steel pipe 4 (see FIG. 1). In this embodiment, at the liner end surface "E" (see FIG. 14) of liner 13i, a foil or end seal member 48 is also bonded to the slurry as it hardens into the liner 13i. Although the embodiment shown employs a flexible fluid resistant foil, a rigid annular washer composed of high alloy steel or other fluid resistant material is an alternative composition.

The foil 48 provides a smooth secondary sealing surface for the joint, parallel to the liner end surface "E" (see FIG. 14) when the casting end ring 47 is removed. Grease or another release compound or coating can be added to the casting end ring 47 or to the foil 48 interface to further assure bonding of the foil 48 to the liner 13i and release of the foil or washer 48 from the casting end ring 47.

Figure 14:
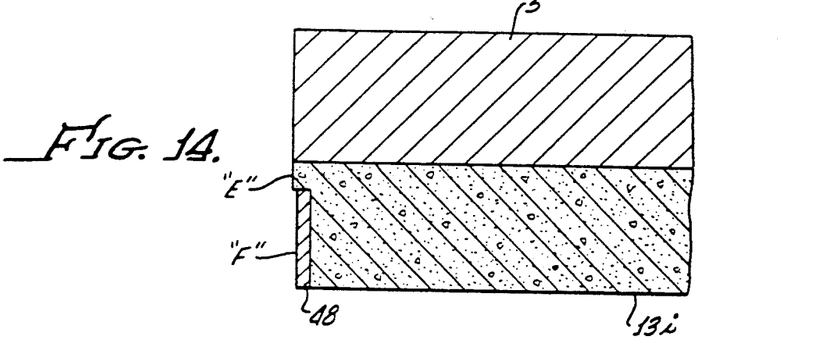
FIG. 14 shows a cross sectional view of the liner end surface insert embodiment shown in FIG. 13 after liner casting.

FIG. 14 shows a cross sectional view of the liner end surface insert embodiment shown in FIG. 13 after the alternative liner 13i casting process step. The casting end ring 47 (see FIG. 13) has been removed after the liner 13i hardens.

Previous efforts to seal the end surface "E" of cement liners after removal of the casting ring 47 (see FIG. 13) experienced difficulties. One problem was damage (e.g., adhesion and liner failure) at this end surface during casting end ring removal. Other sealing problems included porosity of the cement surface, incomplete fill, and improper/discontinuous hardening.

The foil provides a high quality finish sealing surface "F" which can be used to deform a plastic or other secondary seal at the joint. The foil 48 bonding to the liner 13i also insures a complete gap fill (see FIG. 1). The foil 48 also has the advantage of not being attached to anything else, thus "floating" with the end surface as it expands, or otherwise distorts. Distortion may be caused by thermal, pressure, bonding stresses, or chemical changes.

Figure 15:
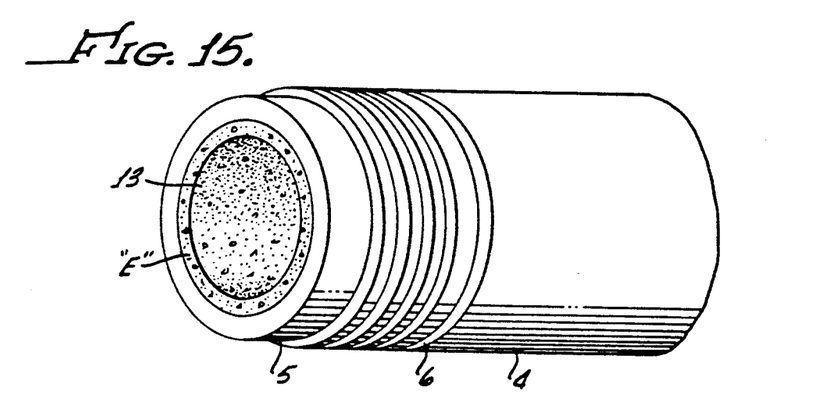
FIG. 15 shows a perspective view of the embodiment shown in FIG. 1.

FIG. 15 shows a perspective view of the pin connector shown in FIG. 1. The first segment 5 is attached to the cylindrical pipe 4 by weldment 6. The end surface "E" of liner 13 can provide a secondary sealing surface for a gasket (e.g., see gasket 20 on FIG. 2).

Still other alternative embodiments are possible. These include: a more tortuous leakage path at the several attached interface surfaces for additional sealing reliability (i.e., restricting fluid passage in the event of sealing/bonding failure) and using self centering gasket(s) to improve flanged joint mating and reliability.

The invention satisfies the need to provide connectors which can structurally and environmentally withstand severe environments at minimal cost. The process of using these connectors is to first modify the ends of conventional non-fluid-resistant pipes by attaching fluid resistant sealing segment end rings. A casting end ring or fluid dam is then placed at the liner end surfaces. The pipe ends are then lined to cover the pipe and to cover and bond to the sealing segment, including the pipe to sealing segment attachment interface. The connector is then joined to a mating connector so that a primary fluid seal at the joint is accomplished at a primary sealing surface of the sealing segment. The joining and/or sealing at the segment mating interface and the liner bonding to the segments prevent fluid contact with the carbon steel pipe when fluids are contained within the lined pipe. The attachment of the rigid sealing segments to the pipe sections diverts joining and sealing loads to the pipe and away from the fragile and brittle liner. The use of low cost piping and brittle liner achieves a tough, low cost and reusable connector. Further advantages of the invention include: redundant sealing ability (if required), and gap filling to obtain low flowing fluid pressure loss.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A fluid connector apparatus comprising:
   a first duct section having 1) an interior passageway surface and 2) a primary joint sealing surface in the proximity of one end of said first duct section;
   a liner attached to, and substantially covering, said interior passageway surface, with a liner end sealing surface proximate to said one end;
   a second duct section having a mating surface proximate to said primary sealing surface when said duct sections are joined;
   means for joining said duct sections; and
   a deformable element capable of sealing said duct sections when sandwiched between said duct sections
   wherein (a) said deformable sealing element is comprised of a fluid sealing metallic portion and an elastomeric portion, (b) said metallic portion does not contact said liner when joined, and (c) said metallic portion is a primary seal in contact with and sandwiched between said primary sealing and said mating sealing surfaces when said sections are joined.

2. The apparatus of claim 1 wherein said elastomeric portion covers said end surface of said liner.

3. The apparatus of claim 1 wherein said deformable element includes a substantially non-deformable portion attached to said liner.

4. The apparatus of claim 3 wherein said non-deformable portion is also attached to said first duct section.

5. A connector apparatus for joining two duct sections containing a fluid, the apparatus comprising:
   a first of said duct sections composed of a structural material and having 1) an interior passageway surface and 2) a primary joint sealing surface in the proximity of one end;
   a liner substantially covering said interior passageway surface and having 1) a void for containing said fluid, and 2) a liner end sealing surface proximate to said one end;
   means for attaching said liner to said first duct section;
   a second of said duct sections having a mating surface proximate to said primary sealing surface when said duct sections are joined; 'a deformable element capable of sealing said duct sections when sandwiched between said primary sealing, said liner end, and said mating surfaces;
   means for joining said duct sections
   wherein said deformable element is comprised of a metallic portion and an elastomeric portion and wherein said metallic portion does not contact said liner when joined;
   wherein said metallic portion is sandwiched between said primary and mating surfaces when said sections are joined;
   wherein said elastomeric portion covers said end surface of said liner; and
   wherein a portion of said liner surface and said mating surface interface to form a cavity when joined and which also comprises a second deformable element contained within said cavity when joined.

6. The apparatus of claim 5 wherein said first deformable element also comprises:
   a first generally rigid portion abutting said second duct;
   a piston-like rod attached to said first rigid portion; p1 a second generally rigid portion abutting said first liner, having a surface which includes at least a portion of said liner end sealing surface and also having a chamber-like surface slidably attached to said rod, said rod and chamber-like surface forming a variable volume piston cavity; and
   a plastically deformable material contained within said piston cavity.

7. The apparatus of claim 6 wherein said first duct section is a cylindrical pipe and a portion of said interface surfaces are planar, and a portion of said planar surfaces are oriented at an oblique angle to the axial and radial directions of said pipe.

8. The apparatus of claim 7 wherein another portion of said interface surfaces are shaped and dimensioned to maintain sealable attachment when said liner shrinks.

9. The apparatus of claim 8 which also comprises a foil element partially covering the end surface of said liner and said foil is composed of a fluid-resistant metallic material.

10. A connector apparatus for joining two duct sections containing a fluid, the apparatus comprising:
    a first of said duct sections composed of a structural material and having 1) an interior passageway surface and 2) a primary joint sealing surface at or near one end;
    a first brittle liner which substantially covers said interior passageway surface and having 1) a low tensile strength compared to said duct sections, 2) a void for containing said fluid, and 3) a liner end sealing surface proximate to said one end;
    means for sealably attaching said first liner to said interior passageway of said first duct section;
    a second of said duct sections having a mating surface proximate to said primary sealing surface when said duct sections are joined; 'a deformable element capable of sealing said duct sections when sandwiched between said duct primarily sealing, said liner end, and said mating surface, wherein said deformable element comprises an elastomeric portion and a substantially non-deformable metallic portion contactably supported by said liner;
    means for joining said duct sections; and
    wherein said elastomeric portion is deformed with a first cavity formed at least in part by one or more surfaces of said non-deformable portion when joined, said cavity shaped and dimensioned to limit said deformation to a value insufficient to transmit a force to said contactable support portion of said liner which would exceed said low tensile strength.

11. The apparatus of claim 10 which comprises a second liner attached to said second duct section, wherein said non-deformable portion of said deformable element comprises two members each of which attached is one of said liners and said first cavity is formed by surfaces of said members when joined.

12. The apparatus of claim 11 wherein surfaces of said first liner and one of said members form a second cavity when joined and which also comprises a second deformable element contained within said second cavity when joined.

13. The apparatus of claim 12 wherein said surfaces of said second cavity form a piston-like variable volume chamber when joined.

14. The apparatus of claim 13 wherein a liner support surface in contactable support of said deformable element is located inward from said interior passageway surface and said support surface is shaped to transmit a component of said deformation force outwardly thereby inhibiting detachment of said liner from said duct section.

* * * * *

UNITED STATES PATENT AND TRADEMARK OFFICE
CERTIFICATE OF CORRECTION

PATENT NO. : 5,240,293

DATED : August 31, 1993

INVENTOR(S) : W. C. Allen et al.

It is certified that error appears in the above-identified patent and that said Letters Patent is hereby corrected as shown below:

Claim 6, Column 11, line 67, delete "pl."

Claim 10, column 12, line 35, after "duct" delete "primarily" and insert therefor -- primary --.

Claim 10, Column 12, line 35, after "said" delete "duct".

Signed and Sealed this

Twenty-second Day of March, 1994

Attest:

BRUCE LEHMAN

Attesting Officer

Commissioner of Patents and Trademarks